No. 869,903. PATENTED NOV. 5, 1907.
M. HARLOE.
COOKING UTENSIL.
APPLICATION FILED JUNE 22, 1906.
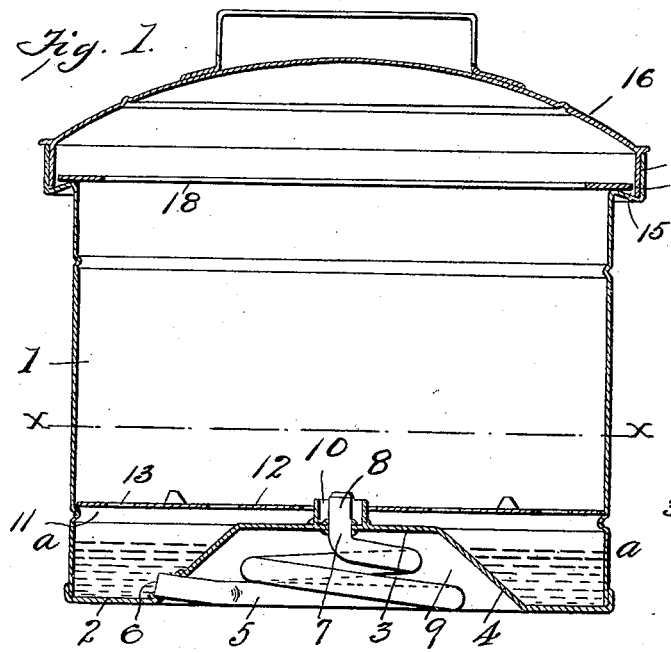
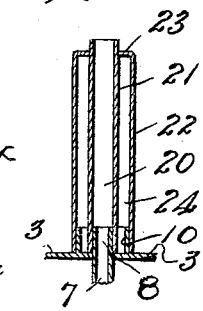
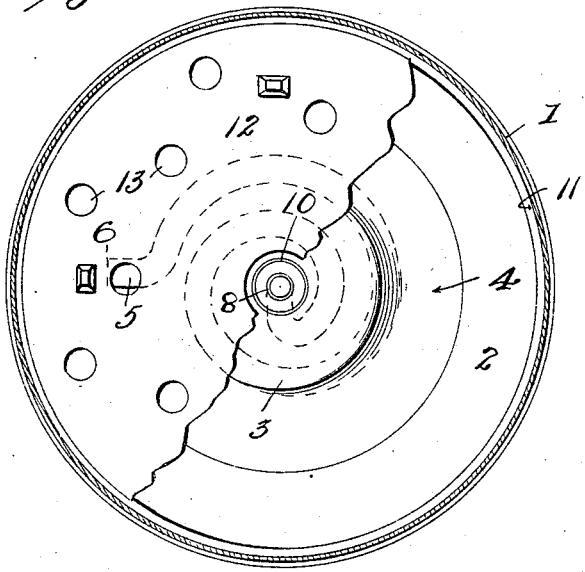
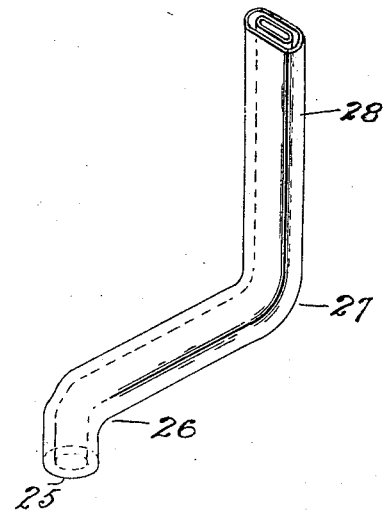
Witnesses
Chas. K. Davis.
W. L. Shipley.
Inventor
Morton Harloe
By Wallace C. Bartlett
Attorney

UNITED STATES PATENT OFFICE.

MORTON HARLOE, OF HAWLEY, PENNSYLVANIA.

COOKING UTENSIL.

No. 869,903.　　　Specification of Letters Patent.　　Patented Nov. 5, 1907.

Application filed June 22, 1906. Serial No. 322,896.

*To all whom it may concern:*

Be it known that I, MORTON HARLOE, a citizen of the United States, residing at Hawley, in the county of Wayne and State of Pennsylvania, have invented certain new and useful Improvements in Cooking Utensils, of which the following is a specification, reference being had therein to the accompanying drawing.

My invention relates to cooking utensils, and especially to a utensil affording, among other advantages, means for generating a copious amount of steam for steam cooking.

The advantages and characteristics of my invention are hereafter fully set forth in connection with a description of the accompanying drawing which illustrates exemplifying structures in which my invention is embodied.

In the drawing: Figure 1 is a vertical section through a cooking utensil embodying my invention; Fig. 2, a horizontal section on the line $x$—$x$ of Fig. 1; Fig. 3, a detail view of an attachment; and Fig. 4, a detail view of another attachment.

Reference numeral 1 designates a receptacle conveniently of general cylindrical form; 2, a flat bottom portion thereof; 3, a raised bottom portion; 4, a bottom surface connecting portions 2 and 3 of any suitable shape, in this instance conical; 5, a coil of tubing which may be of widely different formation, but is in a preferred construction, as shown, in the shape of an extended spiral or conical helix, passing through the surface 4 and communicating with the interior of the vessel at 6 and through bottom portion 3 at 7; 8, the upper end of tube 5, extending upward within the vessel a considerable distance above bottom portion 3.

The receptacle as above described is filled with water to approximately the level $a$ and placed over any suitable heater. The heat has ready access to the bottom surfaces 2, 3, and 4 of the vessel as in any ordinary cooking utensil. The heat also comes into direct contact with all the convolutions of tube 5, which is quickly heated, and water entering the tube is rapidly heated and converted into steam which issues from the tube at point 8 within the vessel in copious quantities. As this volume of steam condenses it falls to the bottom of the vessel and the process is therefore continuous.

It will be observed that my invention affords a largely increased heating surface at the bottom of the utensil. The sides of the recess 9, which accommodates the coil, provide an increased area over the ordinary flat-bottomed receptacle, and in addition to this the entire surface of the tube, which is preferably free from the vessel except at the points 6 and 7 where it communicates with the interior, is freely exposed to heat.

10 is a tubular collar secured to bottom portion 3 and surrounding the end 8 of the tube. When the water level is raised so that it is over the bottom part 3 this collar prevents contact of the cooler water within the vessel with tube portion 8, which, if permitted, would cause undesirable condensation of steam.

11 designates suitable means, such as a beading, in the sides of the vessel for supporting a tray or pan 12. This has an aperture to accommodate the collar 10 and tube 8, and perforations 13. Any suitable article of food may be placed upon the tray 12 and is subjected to the rapid cooking action of the steam. Condensed steam returns to the bottom of the receptacle through perforations 13 in the tray.

14 is the expanded annular top of the receptacle having an inclined or cupped bottom 15; 16 is a cover having a cylindrical part 17 fitting within the top portion 14 of the vessel. Condensation from steam rising in the vessel collects in the cupped part 15, forming an effective water seal and rendering the vessel airtight.

18 is a ring resting on top of the sides of the vessel. One or more rings 18 of different interior diameters may be provided. These rings serve to hold pots or other cooking utensils which may be placed over the vessel 1 when the cover is removed, and will be subjected to the heating action of the steam within the vessel.

In some cases it is desired to heat a much larger quantity of water than is normally contained in the utensil. For this purpose an attachment 20 is provided. This consists of an inner pipe 21 fitting over or within tube 8, and an outer pipe 22 fitting around or within member 8, and an outer pipe 22 fitting around or within the collar 10. These pipes may be separate or connected by flanges 23. In Fig. 3 the attachment is shown in operative position. A dead space is formed at 24 between the two pipes preventing contact of water directly with the inner pipe and thereby preventing undue condensation of steam. With the attachment in place the water level may be raised to any point desired below the top of pipe 21. A large body of water may thus be heated in the utensil and the generation of steam is at the same time not interfered with.

In Fig. 4 a modification of the attachment 20 is shown. This consists of two pipes which are preferably round at the bottom 25 so that they fit the tube member 8 and collar 10. The pipes are bent at an angle toward the horizontal at 26, and again toward the vertical at 27, and the upper part 28 of the pipes is preferably flattened. The shape of the attachment now permits a pot or other cooking utensil to be placed within the vessel without interference with the attachment, and at the same time provides for the heating of a large body of water and for the uninterrupted generation of steam.

The construction described enables an ample quantity of very dry steam to be rapidly produced and applied at the most convenient point for cooking purposes. The utensil provides for manifold uses without undesirable complications.

It will be understood that many changes in detail may be made in the constructions shown without departing from the spirit of my invention.

What I claim is:

In a cooking utensil, a vessel having a cylindrical body, a bottom formed of a single sheet of metal attached to the body, the outer part of the bottom being flat and the central part being formed into a chamber having conical walls and a flat top and inclosed on all sides except the bottom; a conically-coiled tube in the chamber, one end of the tube entering the vessel near the bottom and the other end passing through the top of the chamber and protruding within the vessel, and a collar resting on the inner side of the top of the chamber and encircling the end of the tube, to decrease condensation.

In testimony whereof I affix my signature in presence of two witnesses.

MORTON HARLOE.

Witnesses:
   FENELON B. BROCK,
   D. W. SMITH.